Patented June 1, 1943

UNITED STATES PATENT OFFICE 2,320,717

TERPENE COATING

Frank W. Corkery, Crafton, and Samuel G. Burroughs, Pittsburgh, Pa., assignors to Pennsylvania Industrial Chemical Corporation, a corporation of Pennsylvania No Drawing. Application April 13, 1940, Serial No. 329,578

2 Claims. (Cl. 260—32)

This invention relates to coating compositions having a resin content.

The object of the invention is to provide coating compositions of improved color stability, film-forming qualities, inertness to external reagents, and inertness between the ingredients of the composition; which compositions are economical in their permanent film-forming ingredients, and in the evaporative solvents which may suitably be used with them.

Our invention rises primarily from our discovery and appreciation of the advantageous properties of terpene resins in coating compositions.

We have discovered that a coating composition which includes terpene resin possesses by virtue of that fact high and unexpected color stability, film-hardness, inertness to external reagents and conditions, and inertness and stability within its own composition. We have discovered that the terpene resin, and this is of particular moment with respect to the high melting terpene resins, such as those melting from about 80° C. to and above 150° C. (ball and ring), are soluble in all the drying and semi-drying oils, such as China-wood oil, Perilla oil, soya bean oil, menhaden oil, and the like. It also has high solubility in the common and inexpensive paint and varnish solvents, such as both the aliphatic and aromatic hydrocarbon solvents and turpentine, although it is not completely soluble in ketones and alcohols, except the higher boiling ketones and alcohols. This peculiar property of high solubility in aliphatics is one not to be expected in the hydrocarbon resins to which general class terpene resins belongs, since neither coumarone-indene resin, nor petroleum resin has solubility of high order in the aliphatic hydrocarbon solvents. Such solvency of high-melting terpene resins, even when they are included in relatively small proportion in the least expensive commercial solvents, (such as mineral spirits) gives it great advantage over the other hydrocarbon resins, and resins of other types for inclusion in certain coating compositions, such as flat wall finishes.

We have made paint and varnish bases by dissolving 50 parts of beta-pinene resin having a melting point of about 115° C. (ball and ring) with 50 parts of various drying oils, namely China-wood oil, linseed oil, Perilla oil, soya bean oil, and menhaden oil. These paint and varnish bases made in equal proportions by weight, which may be mixed warm to accelerate the formation of the solution, show high compatibility and stability even at low temperature. All of these solutions, or homogeneous mixtures, upon subjection by refrigeration to temperatures as low as —20° C. for a period of several days, showed no substantial separation between the oil and the resin. We also checked the compatibility of terpene resin with other varnish resins for inclusion with them in paint and varnish bases by melting together beta-pinene resin having a melting point of about 115° C. (ball and ring) and rosin, ester gum, modified phenol aldehyde resin, and modified alkyd resin in equal proportions of terpene resin and each of the other noted varnish resins. Upon examination of these mixtures, thorough compatibility of the terpene resin with the other resins was found. We also found that the homogeneous mixture of terpene resin with each of the other resins tended better to remain in solution than each such other resin by itself.

As a check upon the extreme solubility of the terpene resin for inclusion in a varnish base to be cut or thinned with evaporative solvents, we prepared a solution containing only about one half pound of beta-pinene resin having a melting point of about 130° C. (ball and ring) in one gallon of petroleum naphtha and refrigerated the solution to about —10° F. At that temperature the solution showed no sign of cloudiness. It may be noted in this connection that similarly dilute solutions of other resins, such as coumarone-indene resin, modified phenol aldehyde resins, or the phenolic or maleic types of ester gum (all of melting point equal to that of the terpene resin) show clouds at temperatures which differ for the different resin but which are all well above 40° F.

Coating compositions containing the terpene resin are not susceptible to deterioration because of reaction between the resin and any other constituent of the composition. It may particularly be noted that in the composition the resin does not react with such relatively active but widely used pigments as zinc oxide and white lead. This arises from the fact that terpene resin has an extremely low acid number and no saponification number, and may in practical effect be considered wholly neutral. This neutrality additionally fits a coating composition containing terpene resin to use in localities and under conditions in which it is or may be subjected to action of external reagents. For example, a film containing the terpene resin shows great endurance on concrete surfaces, cement surfaces, lime surfaces, brick surfaces, plaster walls, and other surfaces where there are present chemicals commonly reactive with the resin content of coating compositions. In general the terpene resin has, and imparts to coating compositions, which may otherwise be typically of known sort, resistance to alkalis and other chemicals capable of reacting with saponifiable oils and resins.

Particularly to illustrate the color stability of terpene resin as the resin content of a coating composition, we made three comparative paints.

These paints each consisted essentially of 50% titanium dioxide, 25% heat-bodied soya bean oil, and 25% of resin. In one, the resin was coumarone-indene resin, melting about 115° C. (ball and ring); in one it was rosin ester gum, melting about 90° C. (ball and ring); and in one it was beta-pinene resin melting about 115° C. (ball and ring). These three paints were spread in films on glass and were simultaneously heated for five hours in an oven at a temperature of about 250° F., and without ventilation. The paint film containing coumarone-indene resin turned dark brown. The paint film containing ester gum turned a golden yellow. The paint film containing the beta-pinene resin remained a pure white.

Exemplary of the use of terpene resin in the printing art, we have made solutions of beta-pinene resin having a melting point of about 125° C. (ball and ring) in light petroleum naphtha, and pigmented these solutions by the addition of various suitable lakes, toners, and other pigments, as used in the manufacture of intaglio printing sheets on high-speed printing presses. The resin solution dries very rapidly by evaporation to a tack-free condition, while providing an excellent vehicle for the color pigment. By adding to a solution of the sort given above, a plasticizing content of white mineral oil, as representative of various plasticizers suitably used with the resin, in a quantity equal to 10% the weight of the resin, we provided a good coating material for use in gloss labels, as a wrapper varnish, and for like purposes. For such use, the proportion of plasticizer included in the composition should be relatively low with respect to the resin.

We have found that printing inks made in accordance with any of the standard formulae may suitably contain the terpene resin as its resin content, since the neutrality of the resin renders the ink capable of enduring contact with acids and alkalis, as in soap labels and labels used in association with other such reactive materials.

Considering various other types of coating compositions, an interior white enamel varnish of the mill white type may be made in accordance with any of the standard formulae, but with terpene resin replacing the modified alkyd resin or ester gum commonly included in such formulae. A typical formula for an interior white enamel may consist of kettled soya bean oil, 40 parts, kettled linseed oil, 10 parts, terpene resin 50 parts, white pigment 70 parts, cobalt dryer 1 part, and 60 parts of mineral spirits. A varnish made from China-wood oil and a high grade of terpene resin, such as beta-pinene resin, melting about 100° C. (ball and ring), in accordance with any of the usual formulae for a China-wood oil, gum rosin ester varnish, exhibits better waterproofing, lighter color, faster drying time, and better acid and alkali resistance than the similar varnish containing the gum rosin ester. In varnish coatings it is of advantage that the terpene resin is susceptible of slight oxidation, contributing to the capacity of a film of the varnish including it to increase in hardness with age.

We have hereinabove indiscriminately referred to "terpene resin" and "beta-pinene resin" which is formed of polymers coming within the general definition of terpene resin. It may be explained that beta-pinene polymers and beta-pinene resin are formed by the polymerization of a starting material consisting essentially or preponderantly of beta-pinene in accordance with the procedure disclosed in the application of Samuel G. Burroughs, Serial No. 288,390, filed August 4, 1939. This terpene resin of beta-pinene polymers, which is of itself a new material of commerce, has a coloration lower than a color 1 on the paracoumarone resin color scale.

As produced in accordance with the above-identified procedure, the total of the polymers is a resin having a melting point upwards of 80° C. (ball and ring), which, by the removal of dimers, may be brought to a melting point from 80° C. up to a melting point of about 150° C. (ball and ring) or even higher. Beta-pinene resin (i. e., terpene resin consisting essentially or at least preponderantly of beta-pinene polymers) is the outstanding and preferred example of terpene resin, and may currently be considered in the commercial sense to be terpene resin. At least in the higher melting examples of terpene resin, such as those melting from 80° C. upward, the terpene resin may currently be considered to possess such high melting point by virtue of a preponderance in it of the beta-pinene polymers, and terpene resins melting from about 100° C. upwards may currently be considered to be composed essentially of polymers of beta-pinene.

The solubility of the terpene resin, such as the beta-pinene resin melting from 80° C. upward, is useful in flat wall finishes which typically contain but a small proportion of vehicle and a substantial proportion of coloring pigment, with a relatively great quantity of evaporative solvent, which desirably is a light petroleum distillate. The high solubility of the high-melting terpene resin in aliphatic hydrocarbon solvents is also of critical importance in permitting its use to extend the mass of the rubber-like strength-increasing materials, such as rubber, rubber hydrochloride, chlorinated rubber, isobutylene polymers, and the like, which in dilute solution in light aliphatic, aromatic, or mixed aromatic and aliphatic, hydrocarbon solvents are used to impart tensile strength to the coating film. In such coating compositions coloring pigment also is desirably carried by the terpene resin vehicle.

Throughout the specification and claims where melting point is not specifically identified, it is to be understood as taken by the ball and ring method of softening point determination. Parts as herein given are to be taken as parts by weight.

We claim as our invention:

1. A coating material base consisting of a beta-pinene resin, having a melting point from of at least about 80° C., in solution with petroleum distillate, the said coating material base remaining unclouded at temperatures as low as —10° F. when the base contains as little as one-half pound of the resin, to one gallon of the petroleum distillate.

2. A coating material consisting of a beta-pinene resin, having a melting point of about 130° C., said resin being in solution with petroleum distillate, the said coating material remaining unclouded at temperatures as low as —10° F. when said coating material contains as little as one-half pound of the resin to one gallon of the petroleum distillate.

FRANK W. CORKERY.
SAMUEL G. BURROUGHS.